United States Patent [19]
Liu

[11] Patent Number: 5,676,290
[45] Date of Patent: Oct. 14, 1997

[54] UMBRELLA RACK FOR MOTOR VEHICLES

[76] Inventor: Chang-Lin Liu, Rm. 8, 11F., No. 100, Changchun Road, Chungshan Chiu, Taipei, Taiwan

[21] Appl. No.: 700,826

[22] Filed: Aug. 21, 1996

[51] Int. Cl.⁶ ......................................... B60R 7/12
[52] U.S. Cl. ............... 224/275; 224/915; 224/572; 224/556; 211/62; 211/63; D06/416; D12/416
[58] Field of Search ........................ 224/400, 275, 224/279, 539, 555, 556, 567, 572, 250, 915; 211/62, 63; D06/416; D12/416; 108/44, 43

[56] References Cited

U.S. PATENT DOCUMENTS

| D. 308,442 | 6/1990 | Moll | D12/416 |
|---|---|---|---|
| 1,955,436 | 4/1934 | Mott | 224/275 |
| 2,426,113 | 8/1947 | Northcutt | 224/915 |
| 2,911,105 | 11/1959 | Gingher et al. | 211/62 |
| 4,378,888 | 4/1983 | Reed | 224/915 |
| 5,261,541 | 11/1993 | Li | 211/62 |

FOREIGN PATENT DOCUMENTS

| 758303 | 10/1956 | United Kingdom | 211/63 |
|---|---|---|---|

*Primary Examiner*—Henry J. Recla
*Assistant Examiner*—Gregory M. Vidovich
*Attorney, Agent, or Firm*—Jacobson, Price, Holman & Stern, PLLC

[57] ABSTRACT

An umbrella rack for motor vehicles, including a casing defining a chamber and having a plurality of top holes in communication with the chamber, a plurality of telescopic sockets respectively mounted in the top holes of the casing for holding an umbrella respectively, a sliding water tray mounted in the chamber of the casing for collecting water from the umbrellas being mounted in the top holes of the casing, and a mounting device adapted for securing the casing to the backrest of a vehicle chair.

7 Claims, 6 Drawing Sheets

5,676,290

UMBRELLA RACK FOR MOTOR VEHICLES

BACKGROUND OF THE INVENTION

The present invention relates to an umbrella rack for motor vehicles, and relates more particularly to such an umbrella rack which can be conveniently mounted on the back of the backrest of a vehicle chair to hold umbrellas and to collect rain water from the umbrellas being loaded.

When an umbrella is prepared in a motor vehicle, it may be directly put in the motor vehicle at any place. If a wet umbrella is collapsed and put in a motor vehicle, rain water will drop from the umbrella to wet the inside of the motor vehicle.

SUMMARY OF THE INVENTION

The present invention has been accomplished under the circumstances in view. It is one object of the present invention to provide an umbrella rack which can be conveniently mounted on the backrest of a vehicle chair inside a motor vehicle to hold umbrellas and to collect rain water from the umbrellas being loaded. It is another object of the present invention to provide an umbrella rack which moves with the vehicle chair when the position of the vehicle chair is adjusted. According to the present invention, the umbrella rack comprises a casing, which holds a sliding water tray on the inside, a plurality of telescopic sockets mounted in respective holes at the top of the casing for holding an umbrella respectively for permitting rain water to drop from the umbrella in each hole of the casing to the water tray, and a mounting device for securing the casing to the backrest of a vehicle chair.

DETAILED DESCRIPTION OF THE PREFERRED EMBODIMENT

Figure 1:
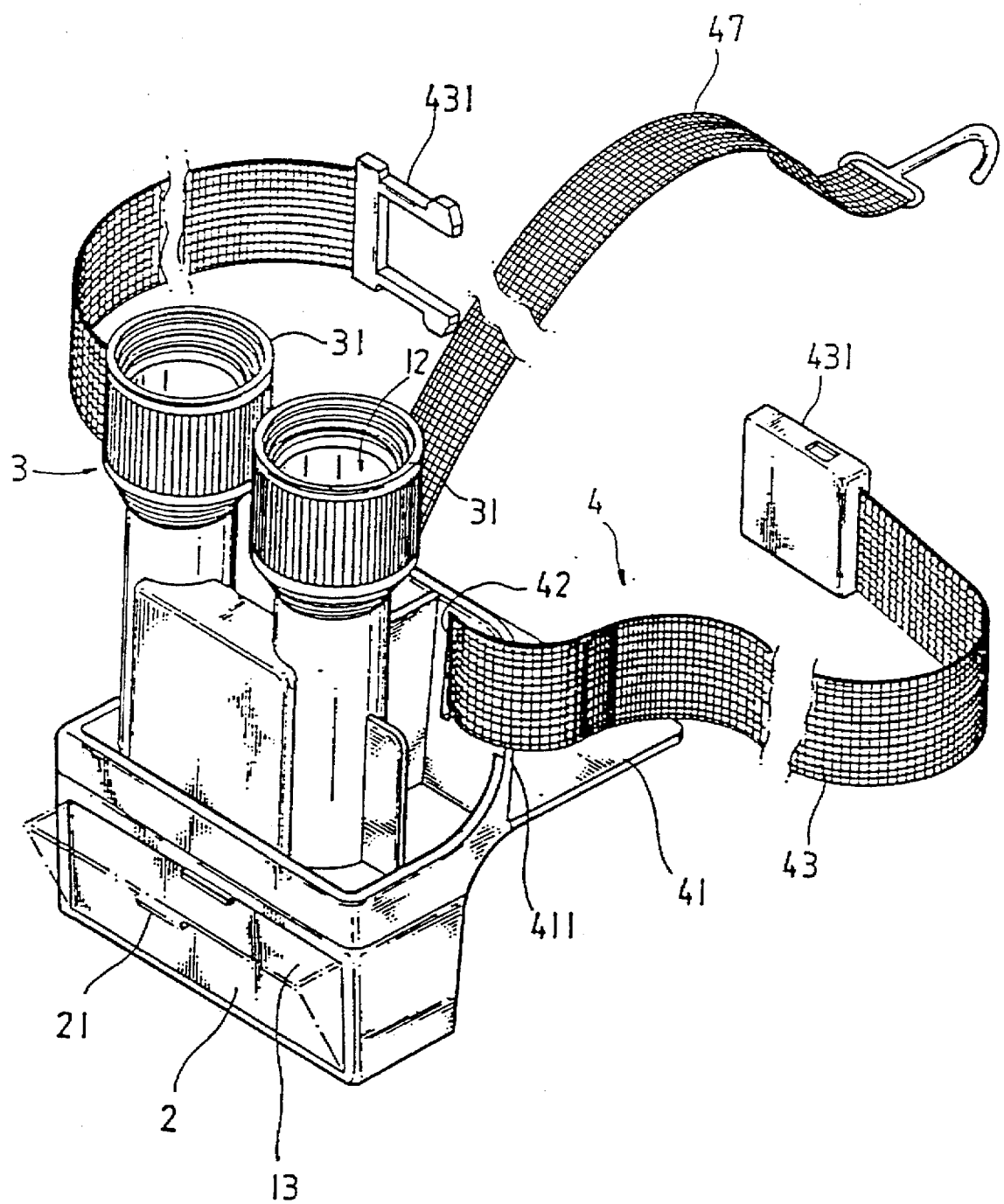
FIG. 1 is an elevational view of an umbrella rack according to the present invention.

Referring to FIGS. from 1 to 5, an umbrella rack for motor vehicles in accordance with the present invention is generally comprised of a casing 1, a water tray 2, two telescopic sockets 3, and a mounting device 4. The casing 1 is a hollow shell having an inside chamber 11, a plurality of raised top holes 12 and a front opening 13 respectively disposed in communication with the inside chamber 11. The water tray 2 is inserted through the front opening 13 into the inside chamber 11 to collect water from the top holes 12, having a retaining knob 21 for positioning. When the retaining knob 21 is pressed down, the water tray 2 can be smoothly taken out of the inside chamber 11 through the front opening 13. The telescopic sockets 3 are respectively mounted in the top holes 12 of the casing 1, each comprised of a plurality of tubular sections 31 that slide one inside another. The mounting device 4 is adapted for securing the casing 1 to a vehicle chair 5 at the back side.

Figure 2:
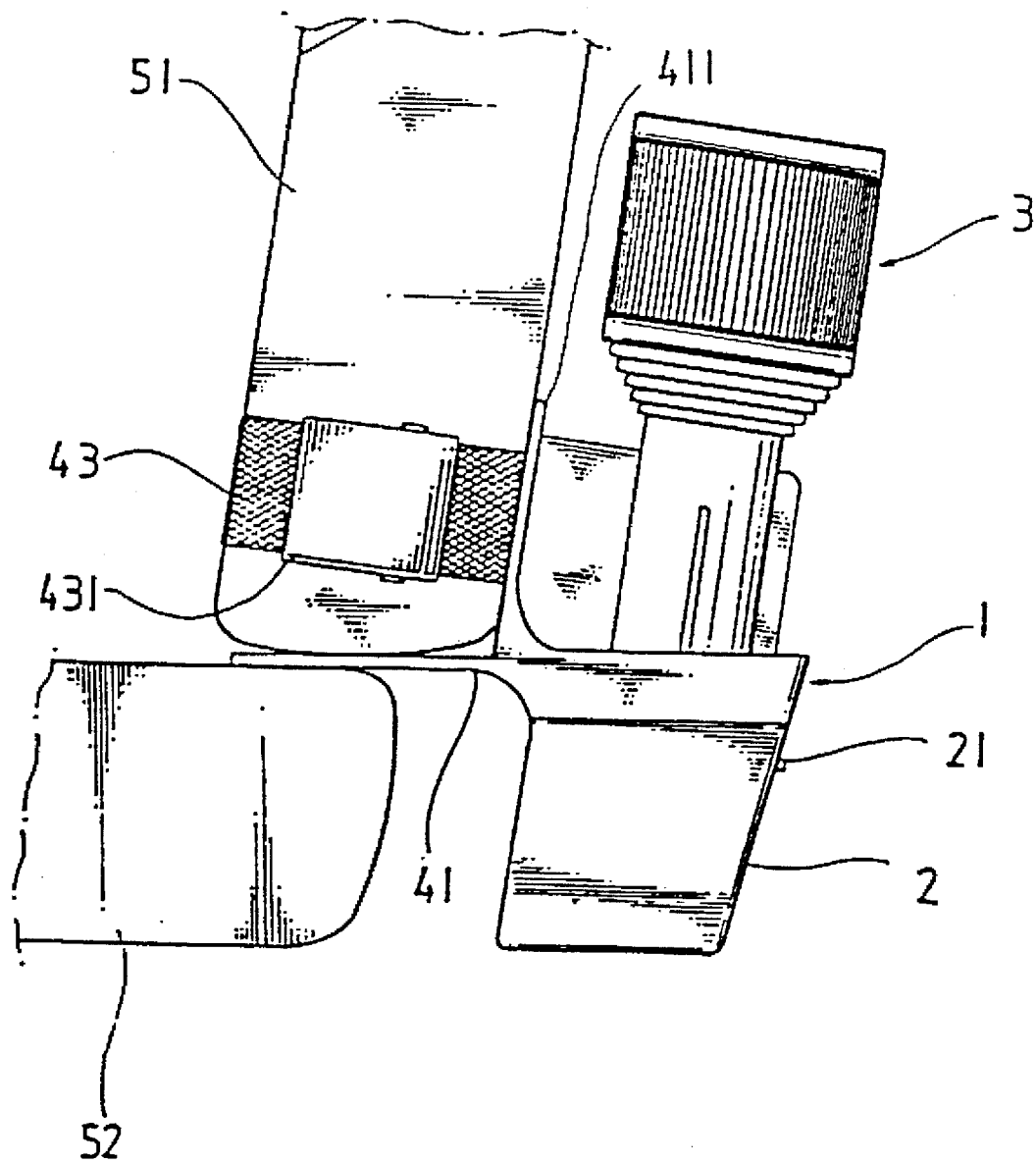
FIG. 2 is an installed view of the present invention, showing the umbrella rack fastened to a vehicle chair.

Referring to FIGS. 1 and 2, as a first embodiment of the present invention, the mounting device 4 comprises a horizontal mounting board 41 perpendicularly raised from the casing 1 at one side opposite to the front opening 13, and adapted for inserting into the gap between the seat 52 and the backrest 51 of the vehicle chair 5, a vertical board 411 raised from the horizontal mounting board 41 adjacent to the casing 1 and having a plurality of slots 42, an elastic strap 43 inserted through the slots 42, a buckle 431 fastened to the elastic strap 43 for joining its two opposite ends, and a fastening strap 47 fixedly secured to the vertical board 411 and adapted for securing to the head rest (not shown) of the vehicle chair 5 above the backrest 51. Through the buckle 431, the elastic strap 43 can be fastened to the backrest 51 of the vehicle chair 5 to hold the casing 1 in place. The casing 1 comprises an inside chamber 11, a plurality of raised top holes 12 and a front opening 13 respectively disposed in communication with the inside chamber 11. The water tray 2 is inserted through the front opening 13 into the inside chamber 11 to collect water from the top holes 12, having a retaining knob 21 for positioning. When in use, the horizontal mounting board 41 is inserted into the gap between the seat 52 and the backrest 51 of the vehicle chair 5, then the fastening strap 47 is secured to the head rest above the backrest 51 of the vehicle chair 5, and the buckle 431 is fastened up to secure the casing 1 to the backrest 51 of the vehicle chair 5. When a wet umbrella is put in one telescopic socket 3, the telescopic socket 3 is pulled up to the extended position, permitting the wet umbrella to be covered within the telescopic socket 3. Therefore, rain water is allowed to drop from the umbrella to the inside of the water tray 2 through the corresponding top hole 12 of the casing 1.

Figure 5:
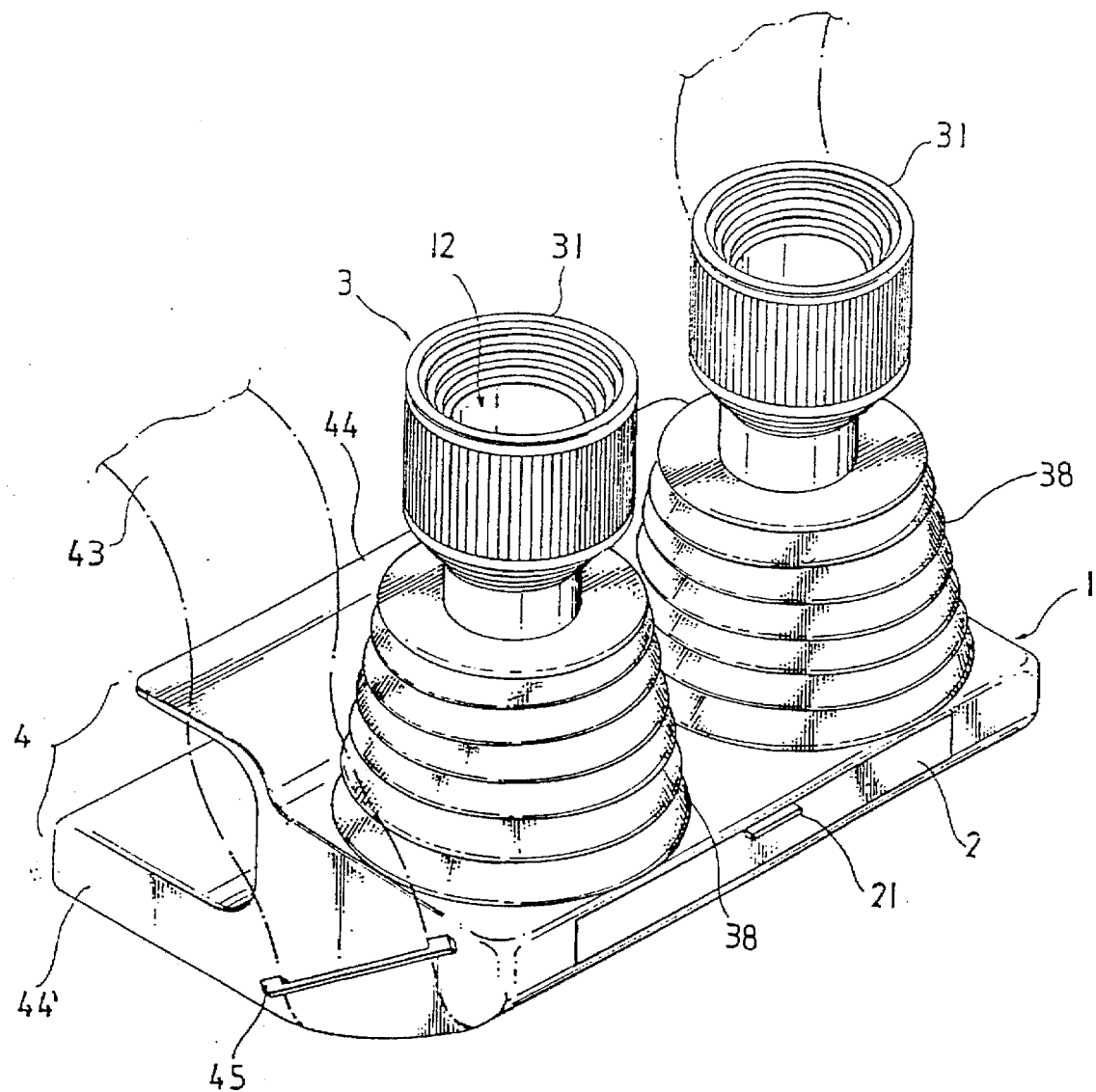
FIG. 5 shows another alternate form of the present invention.
Figure 6:
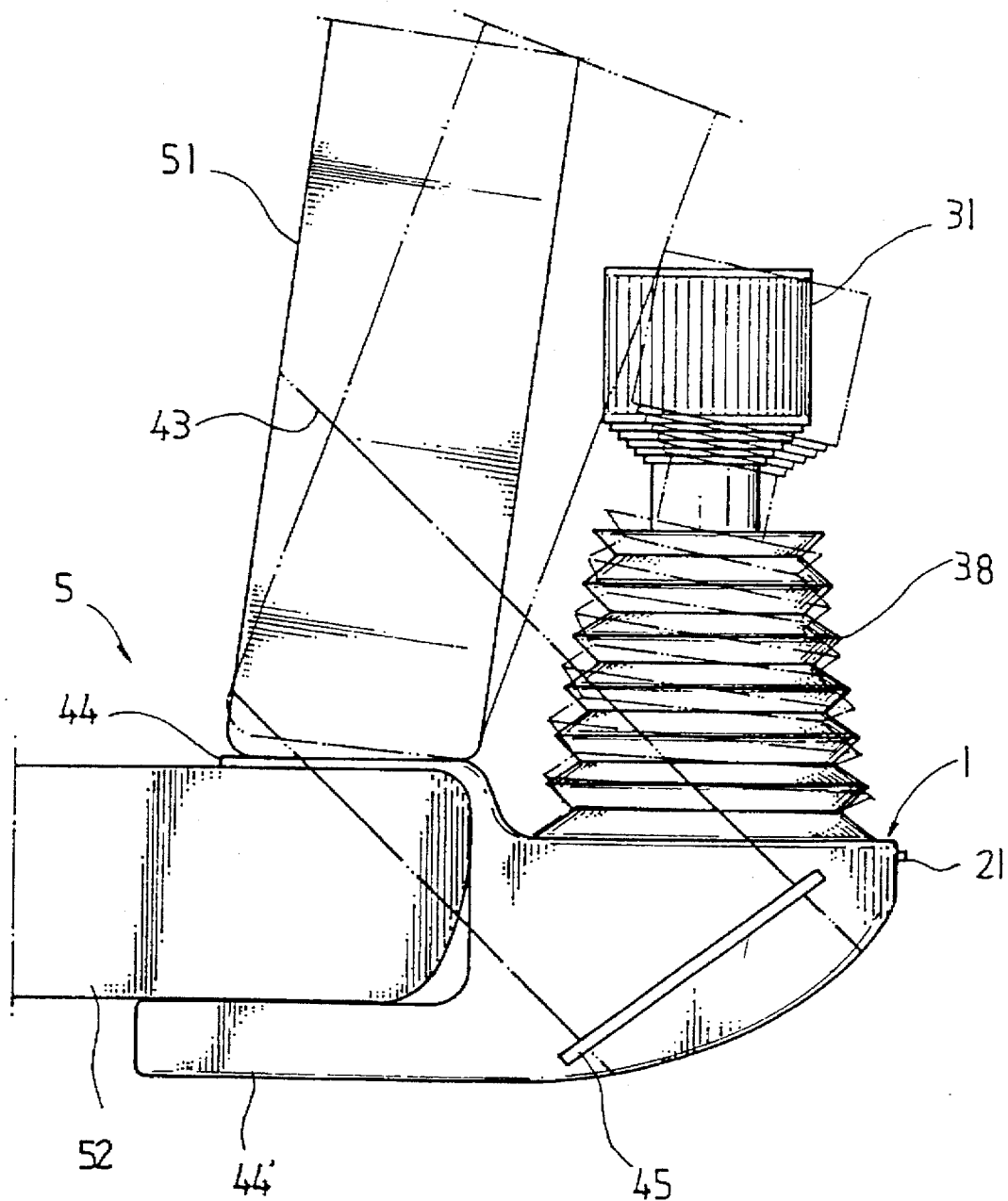
FIG. 6 is an installed view of the alternate form shown in FIG. 5, showing the angle of inclination of the backrest of the vehicle chair adjusted, and the telescopic sockets tilted.

Referring to FIGS. 5 and 6, as an alternate form of the present invention, the mounting device 4 comprises a first horizontal mounting board 44 raised from the casing 1 at one side opposite to the water tray 2, a second horizontal mounting board 44' extending from the casing 1 at one side opposite to the water tray 2, two belt loops 45 fixedly secured to the casing 1 at two opposite lateral sides, and an elastic strap 43 with a buckle 431 (not shown) inserted through the belt loops 45. When the first horizontal mounting board 44 is inserted into the gap between the seat 52 and the backrest 51 of the vehicle chair 5, the second horizontal mounting board 44' is retained to the bottom side of the seat 52, and then the elastic strap 43 is mounted around the backrest 51 of the vehicle chair 5 and secured in place by fastening up the buckle 431. Furthermore, each telescopic socket 3 is coupled to the casing 1 by a bellows tube 38. When not in use, the telescopic sockets 3 are collapsed. When a wet umbrella is put in one telescopic socket 3, the tubular section 31 of the respective telescopic socket 3 is pulled up to the extended position to hold the wet umbrella on the inside, permitting rain water to drop from the umbrella through the corresponding top hole 12 into the water tray 2. When the retaining knob 21 is pressed down, the water tray 2 can be removed from the casing 1, permitting accumulated water to be poured out. Because the telescopic sockets 3 are respectively coupled to the casing 1 by a respective bellows tube 38, they can be tilted to the desired angle when the angle of inclination of the backrest 51 of the vehicle chair 5 is adjusted.

Figure 3:
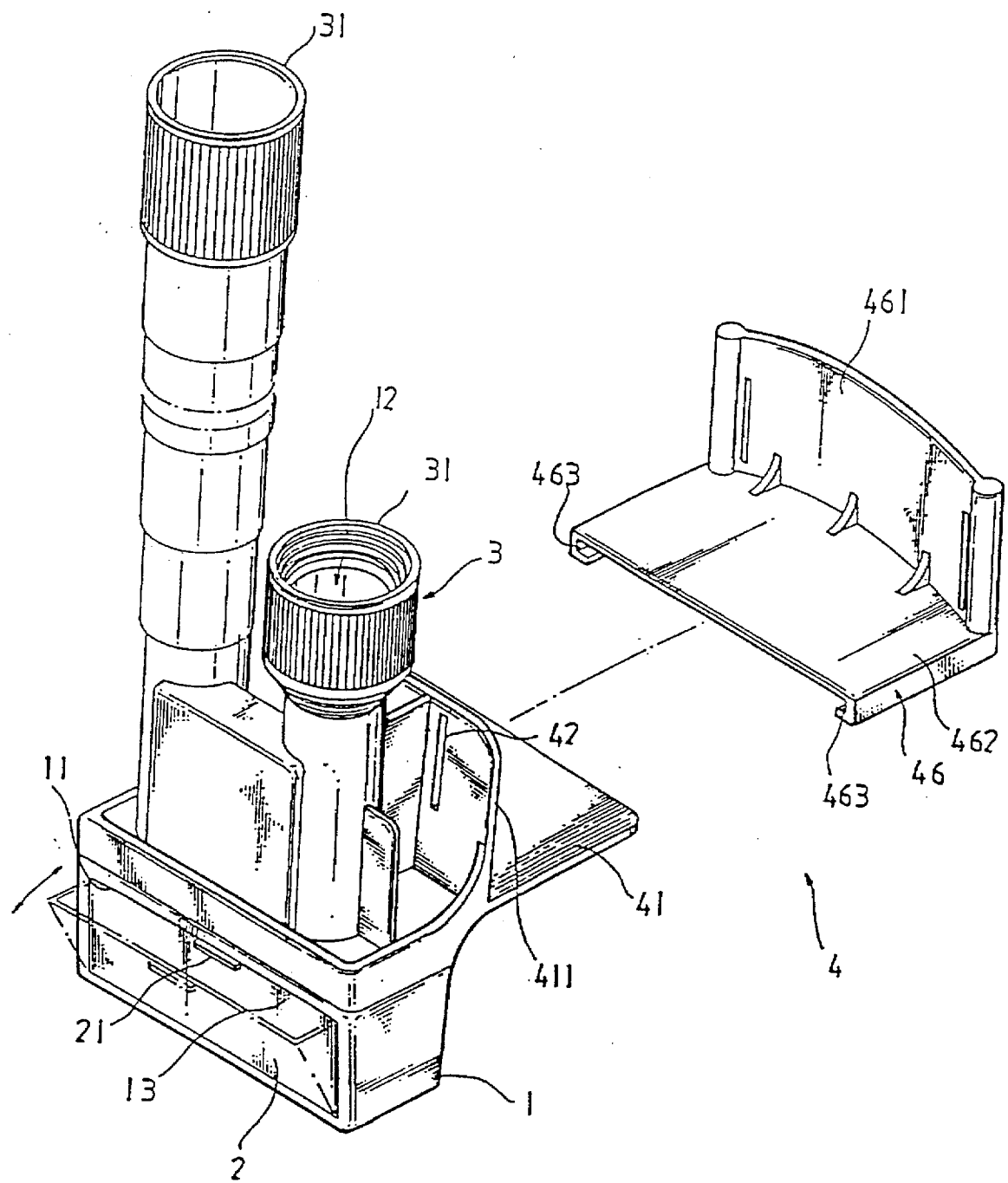
FIG. 3 shows an alternate form of the present invention.
Figure 4:
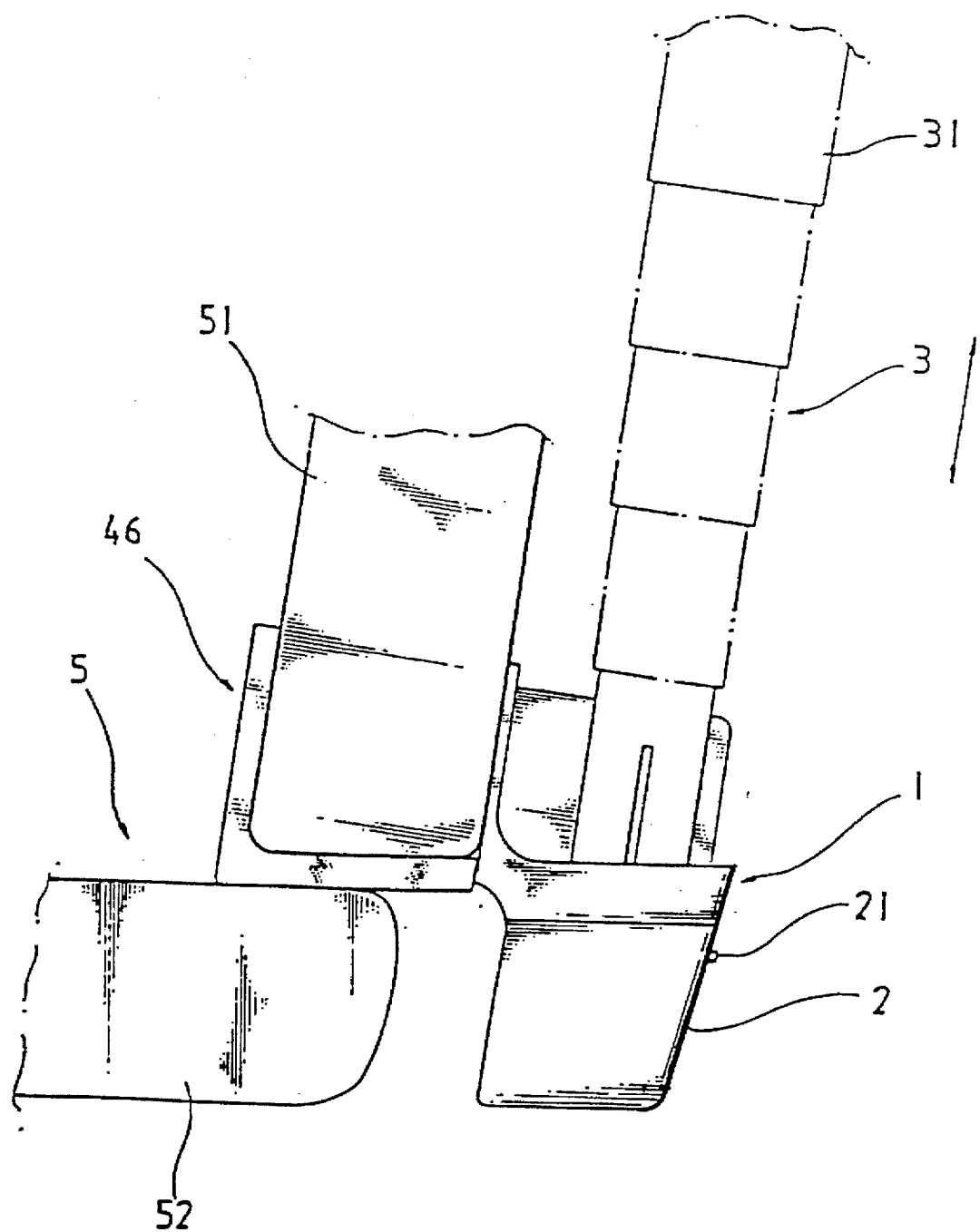
FIG. 4 is an installed view of the alternate form of FIG. 3.

FIGS. 3 and 4, as another alternate form of the present invention, the mounting device 4 comprises a horizontal board 41 perpendicularly raised from the casing 1 at one side opposite to the front opening 13, a vertical board 411 raised from the horizontal mounting board 41 adjacent to the casing 1 and a mounting frame 46 adapted for fastening to the vehicle chair 5 to hold the horizontal mounting board 41. The mounting frame 46 comprises a vertical wall 461 fitting the curvature of the front side of the backrest 51 of the vehicle chair 5, a horizontal wall 462 extending from the bottom side of the vertical wall 461 at right angles and adapted for inserting into the gap between the seat 52 and the backrest 51 of the vehicle chair 5. The horizontal wall 462 defines a track 463 at the bottom side adapted for receiving the horizontal mounting board 41. When the horizontal wall 462 of the mounting frame 46 is inserted into the gap between the seat 52 and the backrest 51 of the vehicle chair 5 from the front side to closely attach the vertical wall 461 to the front side of the backrest 51 of the vehicle chair 5, the horizontal mounting board 41 is inserted into the track 463 of the horizontal wall 462 of the mounting frame 46 to closely attach the vertical board 411 to the back side of the backrest 51 of the vehicle chair 5 to firmly secure the whole assembly of the umbrella rack in place. When a wet umbrella is put in one telescopic socket 3, the tubular sections 31 of the respective telescopic socket 3 are pulled upwards from one another to the extended position to hold the wet umbrella on the inside, permitting rain water to drop from the umbrella through the corresponding top hole 12 into the water tray 2.

It is to be understood that the drawings are designed for purposes of illustration only, and are not intended as a definition of the limits and scope of the invention disclosed.

What the invention claimed is:

1. An umbrella rack for motor vehicles, comprising:

a casing having a chamber, and at least one hole at a top side thereof respectively disposed in communication with said chamber;

a water tray adapted for inserting into the chamber of said casing to collect water from said at least one hole;

at least one telescopic socket respectively mounted in said at least one hole of said casing for holding an umbrella respectively for permitting water being adhered to said umbrella to drop to said water tray through said at least one hole; and a mounting device adapted for securing said casing to the backrest of a vehicle chair.

2. The umbrella rack of claim 1 wherein said water tray has a retaining knob adapted for securing said water tray to the inside of the chamber of said casing, said retaining knob being released from the chamber of said casing for permitting said water tray to be removed from said casing when pressed down.

3. The umbrella rack of claim 1 wherein said mounting device comprises a horizontal mounting board raised from said casing at one side and adapted for inserting into the gap between the backrest and the seat of the vehicle chair, and a vertical board raised from said horizontal mounting board adjacent to said casing and adapted for attaching to the back side of the backrest of the vehicle chair upon the insertion of said horizontal mounting board into the gap between the backrest and the seat of the vehicle chair.

4. The umbrella rack of claim 3 wherein said mounting device further comprises at least one slot in said vertical board, an elastic strap inserted through said at least one slot and adapted for fastening to the backrest of the vehicle chair, and a buckle fastened to said elastic strap for securing it to the backrest of the vehicle chair.

5. The umbrella rack of claim 1 wherein said mounting device comprises a mounting frame having a horizontal wall and a vertical wall and adapted for attaching to the backrest of the vehicle chair at the bottom, said horizontal wall defining a track at a bottom side thereof, said mounting device further comprises a horizontal mounting board raised from said casing at one side thereof and adapted to be inserted into said track when said frame is attached to the backrest of the vehicle chair at the bottom thereof.

6. The umbrella rack of claim 1 wherein said mounting device comprises a first horizontal mounting board and a second horizontal mounting board respectively raised from said casing at different elevations, two belt loops fixedly secured to said casing at two opposite lateral sides, an elastic strap mounted in said belt loops, and a buckle fixedly fastened to said elastic strap and adapted for securing it to the backrest of the vehicle chair, said first horizontal mounting board being adapted for inserting into the gap between the seat and the backrest of the vehicle chair, permitting said second horizontal mounting board to be retained to the seat of the vehicle chair at the bottom thereof.

7. The umbrella rack of claim 1 wherein each of said at least one telescopic socket is coupled to said casing through a respective bellows tube.

* * * * *